(12) United States Patent
Pascual

(10) Patent No.: US 12,031,534 B2
(45) Date of Patent: Jul. 9, 2024

(54) DIAPHRAGM PUMP AND MOTOR SYSTEM AND METHOD

(71) Applicant: Pentair Flow Technologies, LLC, Delavan, WI (US)

(72) Inventor: Joseph A. Pascual, Lake Forest, CA (US)

(73) Assignee: Pentair Flow Technologies, LLC, Delavan, WI (US)

( * ) Notice: Subject to any disclaimer, the term of this patent is extended or adjusted under 35 U.S.C. 154(b) by 0 days.

(21) Appl. No.: 17/648,885

(22) Filed: Jan. 25, 2022

(65) Prior Publication Data

US 2022/0154710 A1 May 19, 2022

Related U.S. Application Data

(60) Continuation of application No. 16/150,170, filed on Oct. 2, 2018, now Pat. No. 11,231,027, which is a
(Continued)

(51) Int. Cl.
| | |
|---|---|
| *H02K 5/14* | (2006.01) |
| *F01C 21/00* | (2006.01) |
| *F04B 17/03* | (2006.01) |
| *F04B 43/02* | (2006.01) |
| *F04B 43/04* | (2006.01) |

(Continued)

(52) U.S. Cl.
CPC .......... *F04B 43/026* (2013.01); *F01C 21/007* (2013.01); *F04B 17/03* (2013.01); *F04B 43/04* (2013.01); *F04B 53/003* (2013.01); *F04B 53/22* (2013.01); *H01R 39/38* (2013.01); *H01R 39/381* (2013.01); *H02K 5/143* (2013.01); *H02K 5/148* (2013.01); *H02K 5/24* (2013.01)

(58) Field of Classification Search
CPC ...... H01R 39/40; H01R 43/12; H01R 39/381; H01R 39/38; H02K 5/148
USPC .......................................... 310/245; 267/155
See application file for complete search history.

(56) References Cited

U.S. PATENT DOCUMENTS

| | | |
|---|---|---|
| 1,332,240 A | 6/1919 | Ward |
| 1,517,101 A | 8/1920 | Borger |
| | (Continued) | |

FOREIGN PATENT DOCUMENTS

| | | |
|---|---|---|
| DE | 19518309 C1 | 3/1996 |
| DE | 102005059118 B3 | 2/2007 |
| EP | 2251579 A1 | 11/2010 |

OTHER PUBLICATIONS

Extended European Search Report, European Patent Application No. 11850394.5, dated Oct. 4, 2018, 6 pages.
(Continued)

*Primary Examiner* — Burton S Mullins
(74) *Attorney, Agent, or Firm* — Husch Blackwell LLP

(57) ABSTRACT

A brush ring assembly including a brush ring, a brush holder coupled to the brush ring, and a brush spring. The brush spring includes a coiled spring body, a first end portion and a second end portion. The first end portion and the second end portion are disposed on opposing ends of the spring body. The first end portion, the second end portion, and the coiled spring body are coupled to the brush holder. The first end portion is bent across at least a portion of the coiled spring body in a direction toward the second end portion.

20 Claims, 10 Drawing Sheets

Related U.S. Application Data continuation of application No. 14/883,025, filed on Oct. 14, 2015, now abandoned, which is a division of application No. 13/333,694, filed on Dec. 21, 2011, now Pat. No. 9,169,837.

(60) Provisional application No. 61/425,696, filed on Dec. 21, 2010.

(51) Int. Cl.
    *F04B 53/00* (2006.01)
    *F04B 53/22* (2006.01)
    *H01R 39/38* (2006.01)
    *H02K 5/24* (2006.01)

(56) References Cited

U.S. PATENT DOCUMENTS

| | | | |
|---|---|---|---|
| 1,794,291 A | 8/1928 | Hobart | |
| 2,325,915 A * | 8/1943 | Naul | H02K 1/17 |
| | | | 310/154.37 |
| 2,463,097 A * | 3/1949 | Gayer | H02K 5/148 |
| | | | 310/239 |
| 2,661,172 A | 9/1952 | Needham | |
| 2,684,825 A | 9/1952 | Laviana et al. | |
| 2,810,536 A | 12/1954 | Cunningham | |
| 3,632,069 A | 1/1972 | Thayer et al. | |
| 3,654,504 A | 4/1972 | Susdorf et al. | |
| 3,739,205 A * | 6/1973 | Winkelmann | H02K 5/148 |
| | | | 310/239 |
| 3,811,803 A | 5/1974 | Frohberg | |
| 4,138,079 A | 2/1979 | Ehret et al. | |
| 4,163,167 A | 7/1979 | Zelt et al. | |
| 4,211,519 A | 7/1980 | Hogan | |
| 4,610,605 A | 9/1986 | Hartley | |
| 4,715,732 A * | 12/1987 | Sanders | H02K 5/1672 |
| | | | 310/90 |
| 4,877,984 A | 10/1989 | Colwell et al. | |
| 5,329,198 A * | 7/1994 | Schmidt | H01R 39/40 |
| | | | 310/239 |
| 5,476,367 A | 12/1995 | Zimmerman et al. | |
| 5,632,607 A | 5/1997 | Popescu et al. | |
| 5,633,542 A | 5/1997 | Yuhi et al. | |
| 5,649,812 A | 7/1997 | Schoenmeyr et al. | |
| 5,704,574 A | 1/1998 | Kasubke | |
| 5,717,271 A * | 2/1998 | Aoki | H01R 39/40 |
| | | | 310/239 |
| 5,752,688 A | 5/1998 | Campbell et al. | |
| 5,818,142 A * | 10/1998 | Edleblute | H02K 5/04 |
| | | | 310/239 |
| 5,927,669 A | 7/1999 | Sassman | |
| 6,011,336 A | 1/2000 | Mathis et al. | |
| 6,071,090 A | 6/2000 | Miki et al. | |
| 6,081,055 A | 6/2000 | Narusawa | |
| 6,089,838 A | 7/2000 | Schoenmeyr et al. | |
| 6,144,134 A * | 11/2000 | Lin | H01R 39/40 |
| | | | 310/239 |
| 6,218,752 B1 | 4/2001 | Chang et al. | |
| 6,227,826 B1 | 5/2001 | Lo | |
| 6,318,973 B1 | 11/2001 | Sailer et al. | |
| 6,623,245 B2 | 9/2003 | Meza et al. | |
| 6,700,291 B2 | 3/2004 | Uchida et al. | |
| 6,840,745 B1 | 1/2005 | Macauley et al. | |
| 6,883,417 B2 | 4/2005 | Headley | |
| 6,922,003 B2 | 7/2005 | Uchida | |
| 7,013,793 B2 | 3/2006 | Dang | |
| 7,037,086 B2 | 5/2006 | Irvine | |
| 7,186,095 B2 | 3/2007 | Skinner | |
| 7,424,847 B2 | 9/2008 | Hart | |
| 7,619,335 B2 | 11/2009 | Suzuki et al. | |
| 2004/0009075 A1 | 1/2004 | Meza et al. | |
| 2004/0057845 A1 | 3/2004 | Skinner | |
| 2004/0057848 A1 | 3/2004 | Haller et al. | |
| 2005/0249610 A1 | 4/2005 | Fischer | |
| 2006/0073036 A1 | 4/2006 | Pascual et al. | |
| 2006/0226730 A1 * | 10/2006 | Fulton | H01R 39/44 |
| | | | 310/239 |
| 2007/0001535 A1 | 1/2007 | Mori | |
| 2007/0116582 A1 | 1/2007 | Skinner | |
| 2007/0071615 A1 | 3/2007 | Nakajima et al. | |
| 2007/0092385 A1 | 4/2007 | Petrie | |
| 2007/0128055 A1 | 6/2007 | Lee | |
| 2008/0060515 A1 | 3/2008 | Cho | |
| 2008/0095651 A1 | 4/2008 | Onishi | |
| 2008/0267801 A1 | 6/2008 | Maki et al. | |
| 2009/0068036 A1 | 3/2009 | Hsu et al. | |
| 2011/0115331 A1 * | 5/2011 | Yu | H01R 39/381 |
| | | | 310/246 |

OTHER PUBLICATIONS

International Search Report and Written Opinion, International Patent Application No. PCT/US2011/066591, dated Jun. 28, 2012, 8 pages.

Lundell, R., U.S. Pat. No. 459,367, "Commutator Brush and Holder" issued Sep. 8, 1891.

* cited by examiner

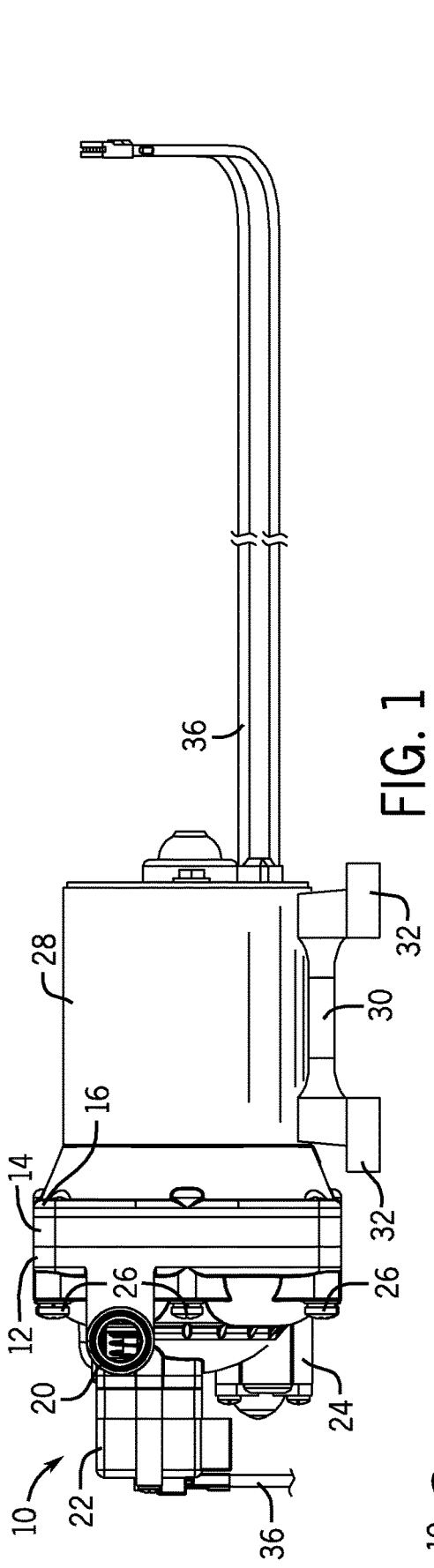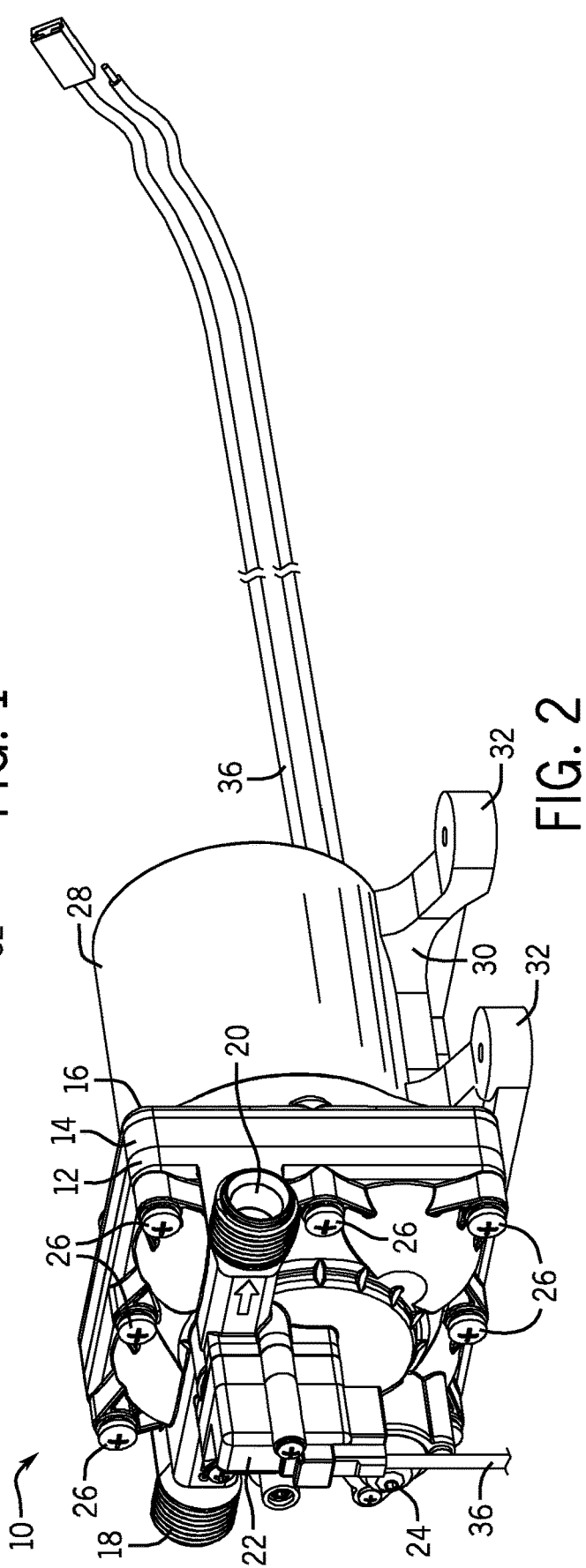

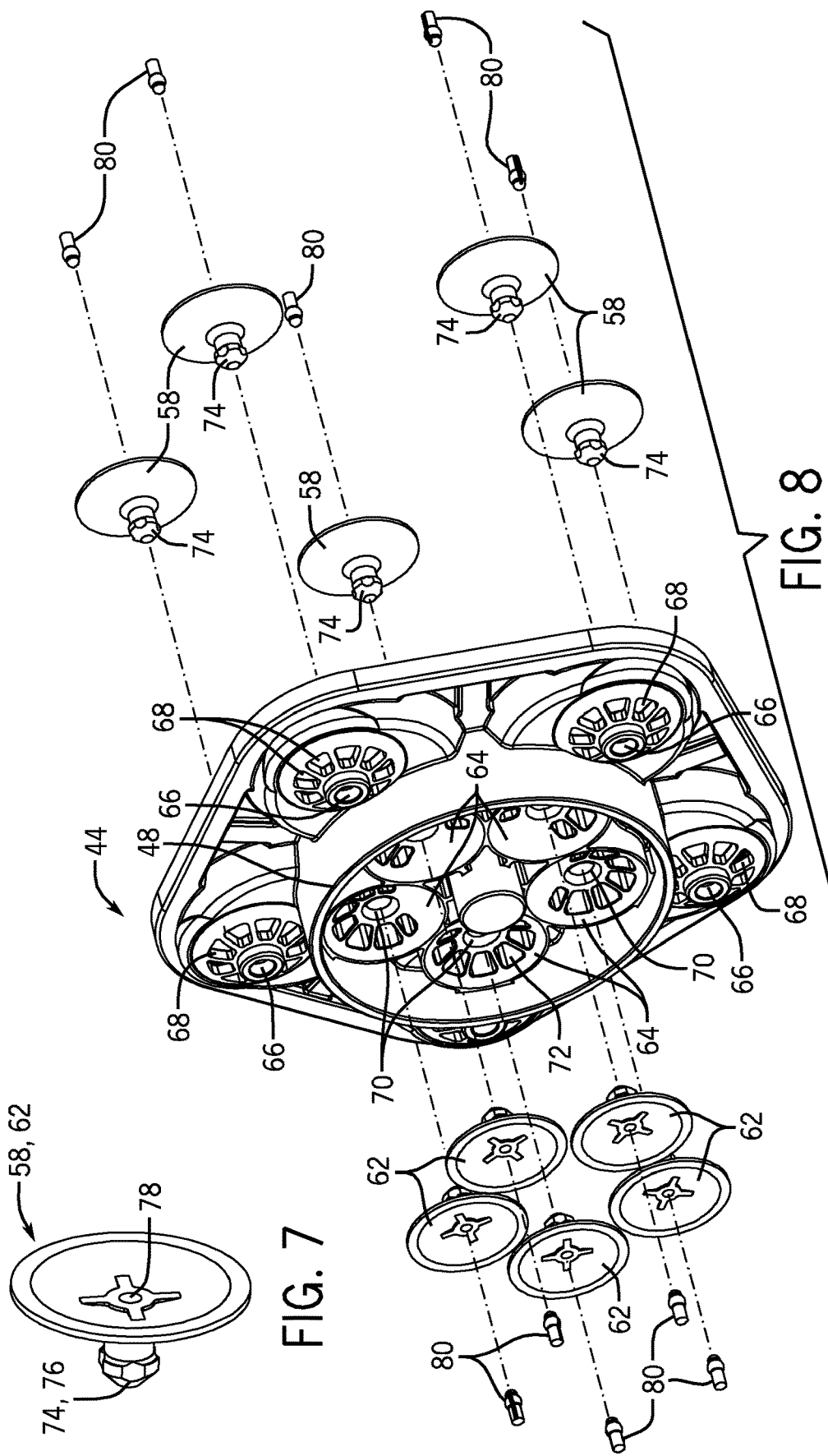

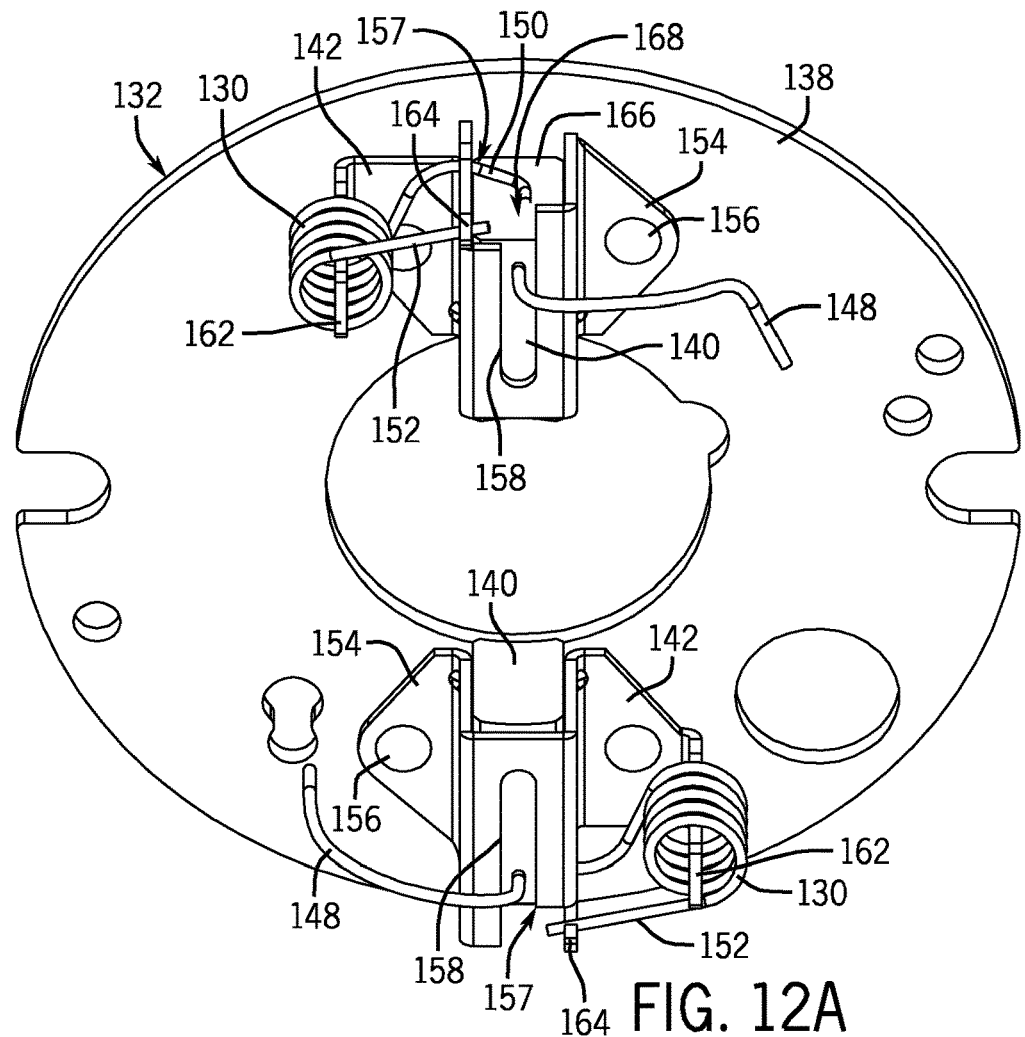
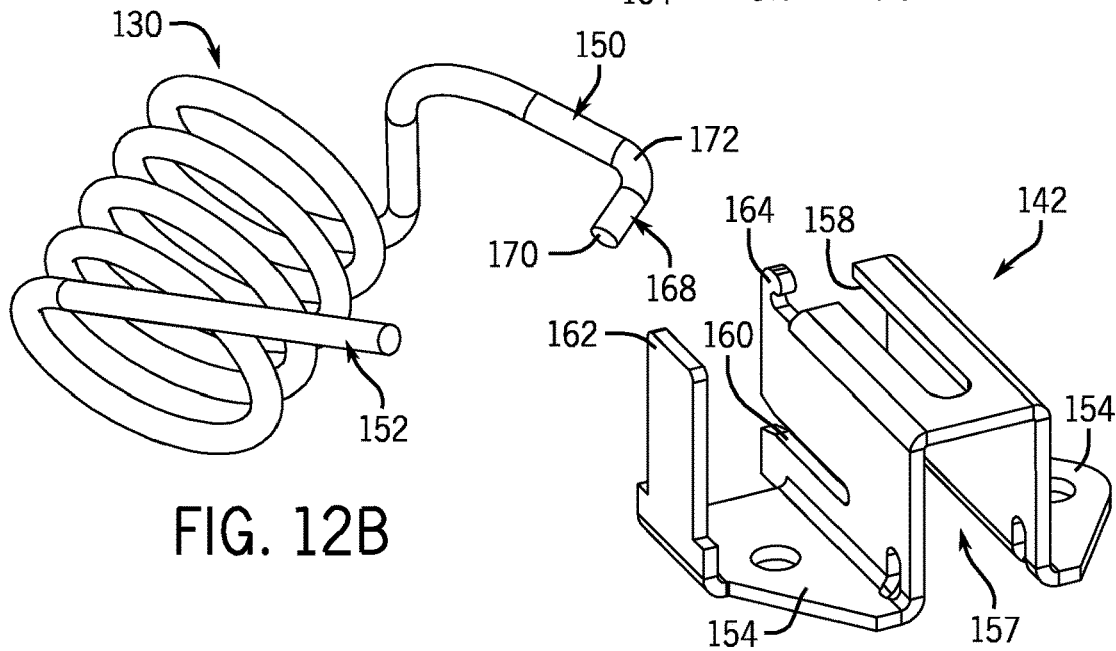
FIG. 12A
FIG. 12B
FIG. 12C

DIAPHRAGM PUMP AND MOTOR SYSTEM AND METHOD

RELATED APPLICATIONS

This application is a continuation of U.S. application Ser. No. 16/150,170, filed Oct. 2, 2018, which is a continuation of U.S. application Ser. No. 14/883,025, filed Oct. 14, 2015, which is a divisional of U.S. application Ser. No. 13/333,694, filed Dec. 21, 2011 and which issued as U.S. Pat. No. 9,169,837 on Oct. 27, 2015, which claims priority under 35 U.S.C. § 119 to U.S. Provisional Patent Application No. 61/425,696 filed on Dec. 21, 2010, the entire contents of which are incorporated herein by reference.

BACKGROUND

Wobble-plate pumps typically include pistons that move in a reciprocating manner within corresponding pump chambers. In many cases, the pistons are moved by a surface of a wobble plate that is rotated by a motor or other driving device. The reciprocating movement of the pistons pumps fluid from an inlet chamber to an outlet chamber of the pump.

Many conventional pumps include a valve housing with inlet and outlet valves that allow fluid in and out of the pump chambers in response to the reciprocating movement of the pistons. The inlet and outlet valves are often press-fitted into the valve housing. However, at high pressures and high viscosities, valves have a tendency to balloon, spin, or pop out of the valve housing, greatly reducing the efficiency of the pump and requiring maintenance to be performed on the pump. In addition, at high pressures and high viscosities, the valve housing has a tendency to wobble within the pump, causing unnecessary wear on the o-ring that helps seal the inlet and outlet chambers.

Many conventional pumps are also coupled to baseplates or pedestals to support the weight of the pump and a corresponding motor. The baseplate or pedestal usually has a small base coupled to the motor via mounting holes and fasteners and legs extending from the base to allow the pump and motor assembly to sit on or be coupled to a flat surface.

SUMMARY

Some embodiments provide a brush ring assembly including a brush ring, a brush holder coupled to the brush ring, and a brush spring. The brush spring includes a coiled spring body, a first end portion and a second end portion. The first end portion and the second end portion are disposed on opposing ends of the spring body. The first end portion, the second end portion, and the coiled spring body are coupled to the brush holder. The first end portion is bent across at least a portion of the coiled spring body in a direction toward the second end portion.

Some embodiments provide a brush ring assembly including a brush ring, a brush holder coupled to the brush ring, and a brush spring including a first end portion, a second end portion, and a coiled spring body with a central opening. The first end portion and the second end portion are coupled to the brush holder. The first end portion includes a bent portion that is bent toward a longitudinal axis extending through the central opening of the coiled spring body.

Some embodiments provide a brush ring assembly for a pump motor, the brush ring assembly including a brush ring, a brush holder coupled to the brush ring, a brush spring, and a brush. The brush holder includes a brush opening, and the brush extends through the brush opening. The brush spring includes a coiled spring body, a first end portion and a second end portion. The first end portion and the second end portion are coupled to the brush holder. The first end portion contacts a top surface of the brush and includes a first bend toward the top surface of the brush and a second bend across at least a portion of the coiled spring body in a direction toward the second end portion.

DESCRIPTION OF THE DRAWINGS

FIG. 1 is a side view of a diaphragm pump according to one embodiment of the invention.

FIG. 2 is a perspective view of the diaphragm pump of FIG. 1.

FIG. 7 is a perspective view of a valve for use with the valve housing of FIGS. 5A-6B.

FIG. 8 is an exploded perspective view of a valve housing for use with a diaphragm pump according to another embodiment of the invention.

FIGS. 12A-12C are perspective parts views of a brush ring assembly of the motor of FIG. 11.

DETAILED DESCRIPTION

Figure 3:
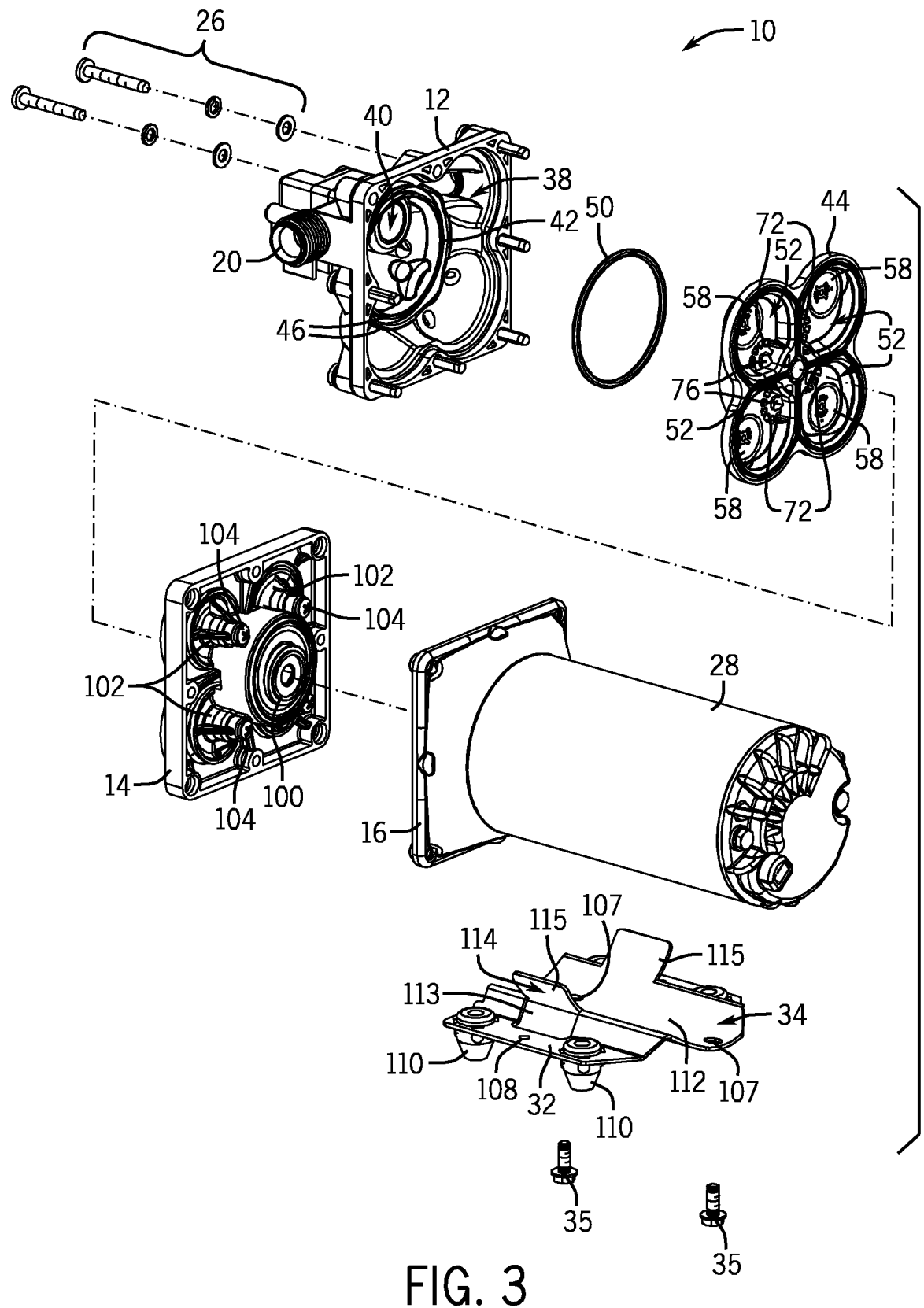
FIG. 3 is an exploded perspective view of a diaphragm pump according to another embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIGS. 1 and 2 illustrate a pump 10 according to one embodiment of the invention. The pump 10 can include an upper housing 12, a diaphragm assembly 14, a lower housing 16, an inlet 18, an outlet 20, a pressure switch assembly 22, and a relief valve assembly 24. The upper housing 12, the diaphragm assembly 14, and the lower housing 16 can be coupled together via fasteners 26 (e.g., screws and washers, nuts and bolts, rivets, etc.). Reference herein and in the appended claims to terms of orientation (such as upper and lower) are provided for purposes of illustration only and are not intended as limitations upon the scope of the invention. The pump 10 and various elements of the pump 10 can be oriented in any manner desired while still falling within the spirit and score of the present invention.

Figure 4:
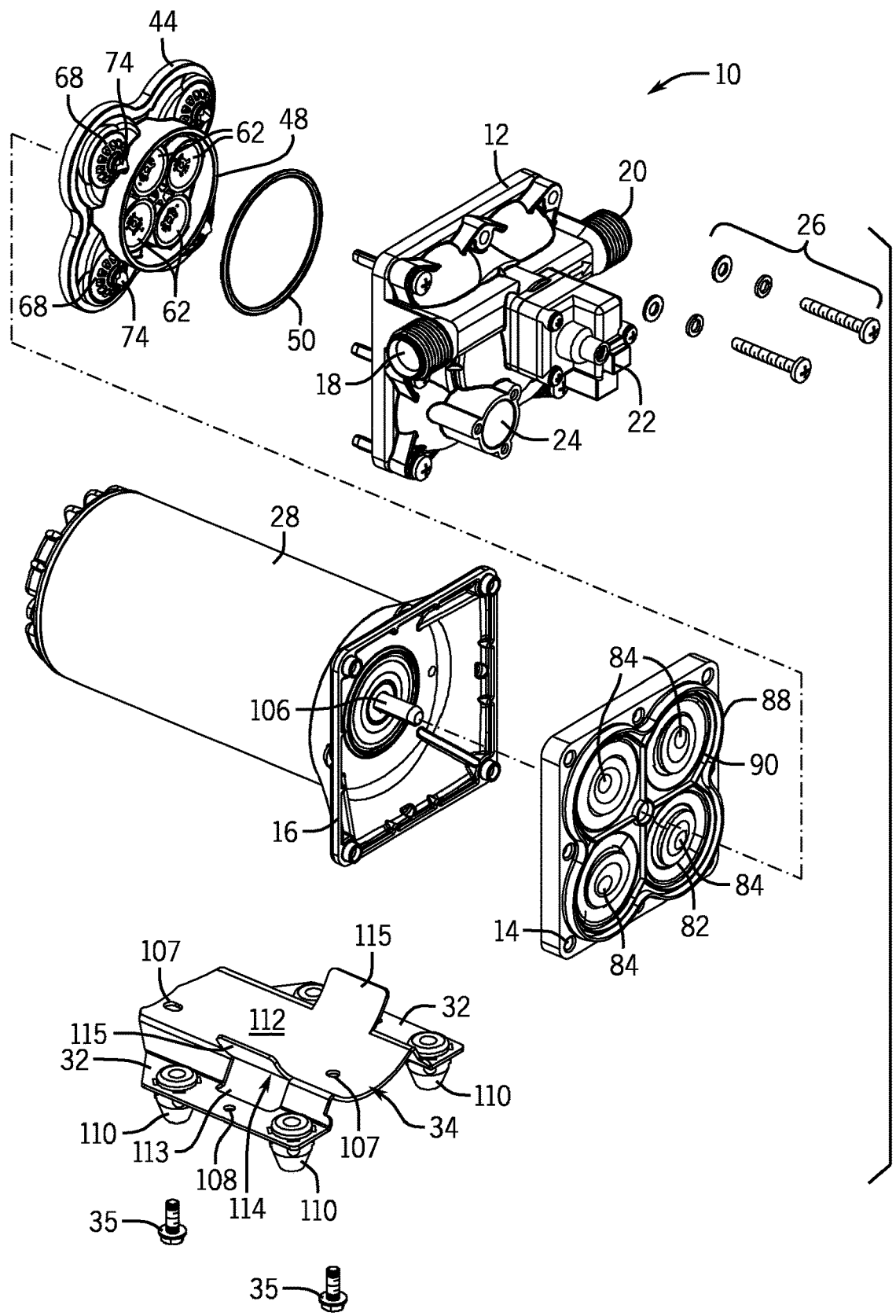
FIG. 4 is another exploded perspective view of the diaphragm pump of FIG. 3.

The pump 10, and more specifically the lower housing 16, can be coupled to a motor 28. In one embodiment, as shown in FIGS. 1 and 2, the pump 10 and the motor 28 can be coupled to a baseplate 30 via fasteners (not shown). The baseplate 30 can include legs 32 adapted to support the weight of the pump 10 and the motor 28. In another embodiment, as shown in FIGS. 3 and 4, the pump 10 and the motor 28 can be coupled to a baseplate 34 via fasteners 35. In addition, as shown in FIGS. 1 and 2, the motor 28 and the pressure switch assembly 22 can include electrical connectors 36.

The inlet 18 can be connected to an inlet fluid line (not shown) and the outlet 20 can be connected to an outlet fluid line (not shown). As shown in FIGS. 1 and 2, both the inlet 18 and the outlet 20 can be threaded or barbed and can be connected to the respective fluid lines via fittings, such as quick disconnect fittings, compression fittings, swage fittings, etc. Gaskets, o-rings, or other seals can also be included to help prevent leakage between the inlet 18 and/or the outlet 20 and their respective fittings and/or fluid lines. As shown in FIG. 3, the upper housing 12 can include an inlet chamber 38 in communication with the inlet 18 and an outlet chamber 40 in communication with the outlet 20. The inlet chamber 38 and the outlet chamber 40 can be separated by a ring 42.

As shown in FIGS. 3 and 4, the pump 10 can include a valve housing 44 positioned between the upper housing 12 and the diaphragm assembly 14. The valve housing 44 can assist in enclosing and separating the inlet chamber 38 from the outlet chamber 40. More specifically, as shown in FIG. 3, the ring 42 of the upper housing 12 can have raised outer walls 46 to engage a dividing wall 48 (as shown in FIG. 4) of the valve housing 44 between the raised outer walls 46 when the pump 10 is assembled. The dividing wall 48 can be cylindrical in shape and extend axially away from a first side of the valve housing 44. An o-ring 50 (as also shown in FIG. 4) can be set between the ring 42 and the dividing wall 48 to provide a water-tight seal between the inlet chamber 38 and the outlet chamber 40. The raised outer walls 46 can center and secure the valve housing 44 in place and can also prevent the valve housing 44 from wobbling during pump operation at high pressures. The raised outer walls 46 can secure the o-ring 50 in place, which can prevent the o-ring 50 from expanding outside past the ring 42 and the dividing wall 48 and also can greatly reduce wear on the o-ring 50.

Figure 5B:
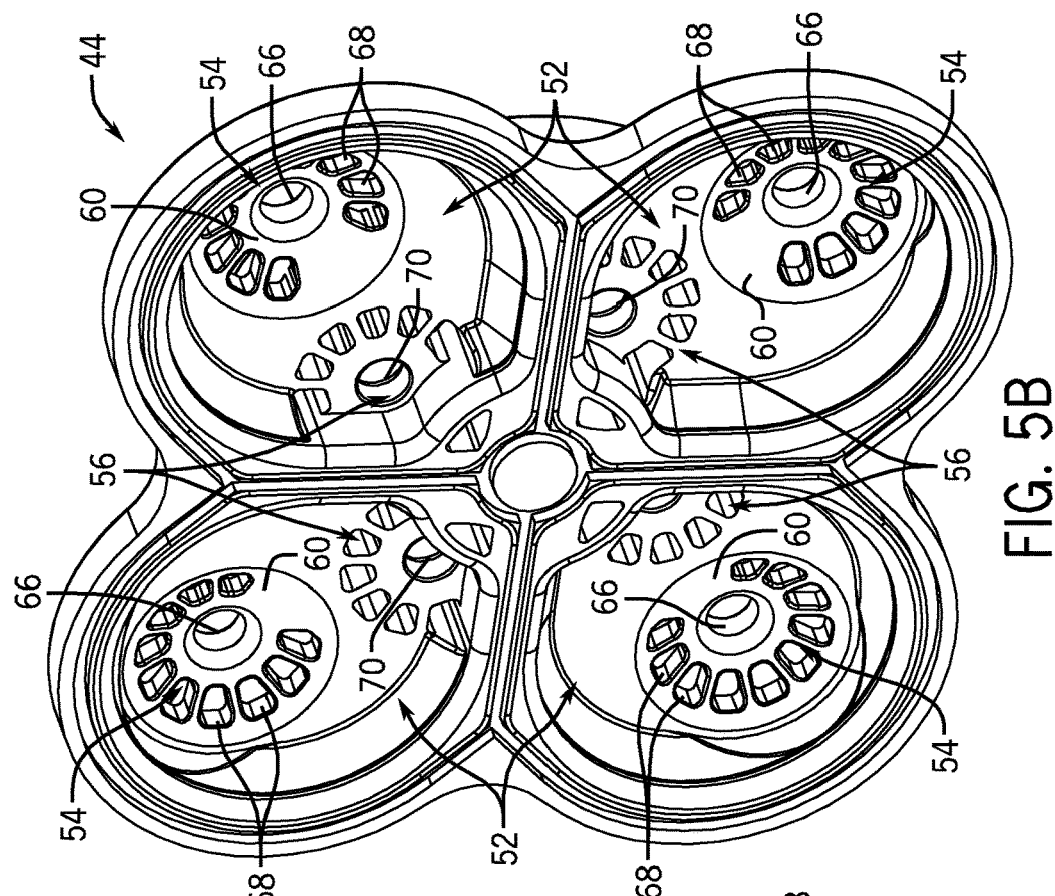
FIGS. 5A and 5B are rear perspective views of a valve housing with and without valves, respectively, for use with the diaphragm pump of FIG. 1 or 3.
Figure 5A:
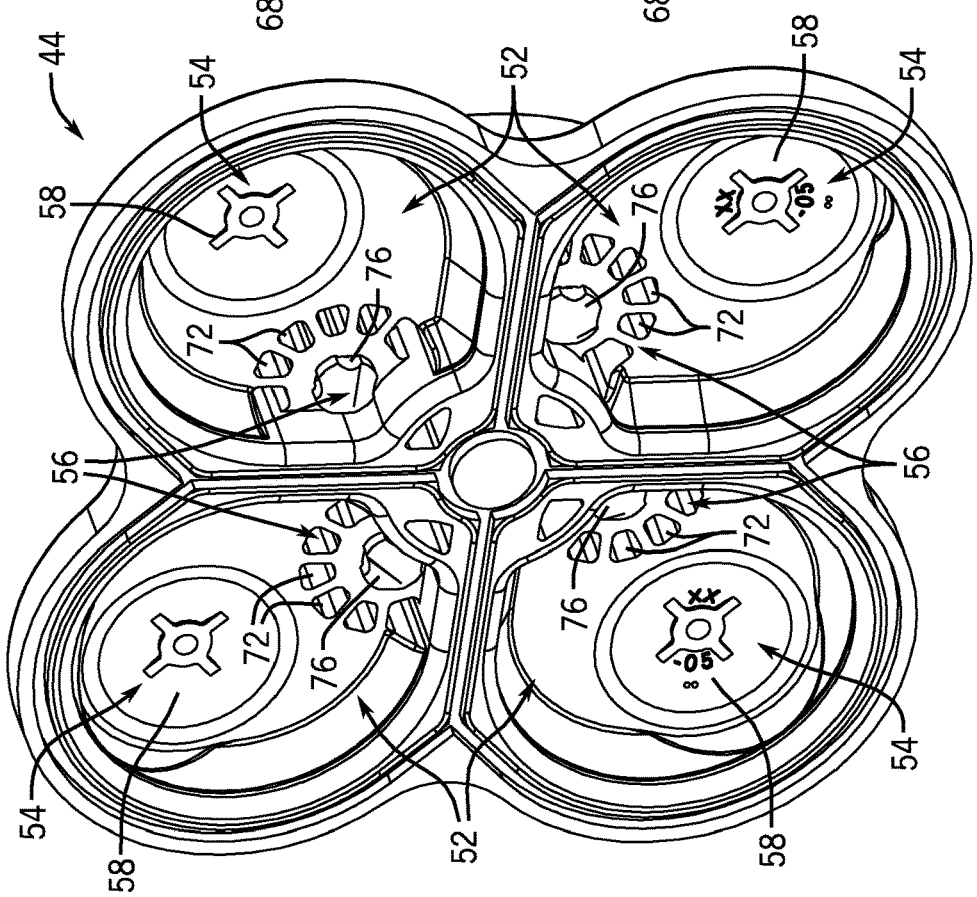
Figure 6B:
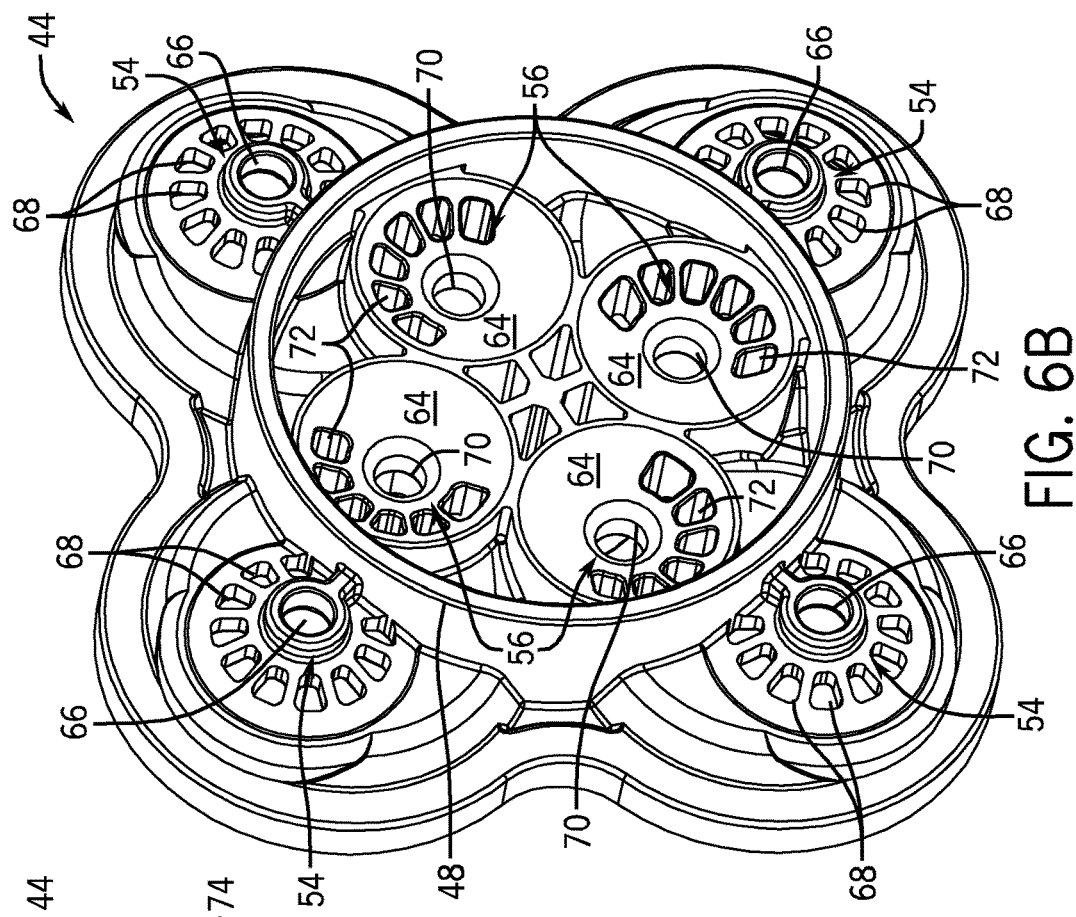
FIGS. 6A and 6B are front perspective views of a valve housing with and without valves, respectively, for use with the diaphragm pump of FIG. 1 or 3.

In addition, as shown in FIG. 3, one or more pump chambers 52 can be defined on a second side of the valve housing 44 opposite the first side. In some embodiments, the valve housing 44 can define two, three, four (as shown in FIGS. 1-4), five (as shown in FIG. 8), or more pump chambers 52. As shown in FIGS. 5A and 5B, each pump chamber 52 can include an inlet port 54 and an outlet port 56. As shown in FIGS. 5A-5B and 6A-6B, each inlet port 54 can include an inlet valve 58 that is positioned within an inlet valve seat 60 and each outlet port 56 can include an outlet valve 62 that is positioned within an outlet valve seat 64. In one embodiment, the inlet valves 58 can face the pump chambers 52, while the outlet valves 62 can face the upper housing 12. In addition, as shown in FIG. 6B, the dividing wall 48 can protrude from the first side of the valve housing 44 to separate the inlet valves 58 from the outlet valves 62 on the side of the valve housing 44 that faces the upper housing 12 and that is opposite the pump chambers 52 on the second side (e.g., to help separate incoming fluid from the inlet chamber 38 through the inlet valves 58 and outgoing fluid from the outlet valves 62 through the outlet chamber 40). In some forms, the dividing wall 48 extends outwardly from the first side of the valve housing 44 such that the dividing wall 48 extends farther away from the valve housing 44 than any part of one or both of the inlet valves 58 and the outlet valves 62. Accordingly, the dividing wall 48 extends past one or both of the inlet valves 58 and the outlet valves 62.

Figure 6A:
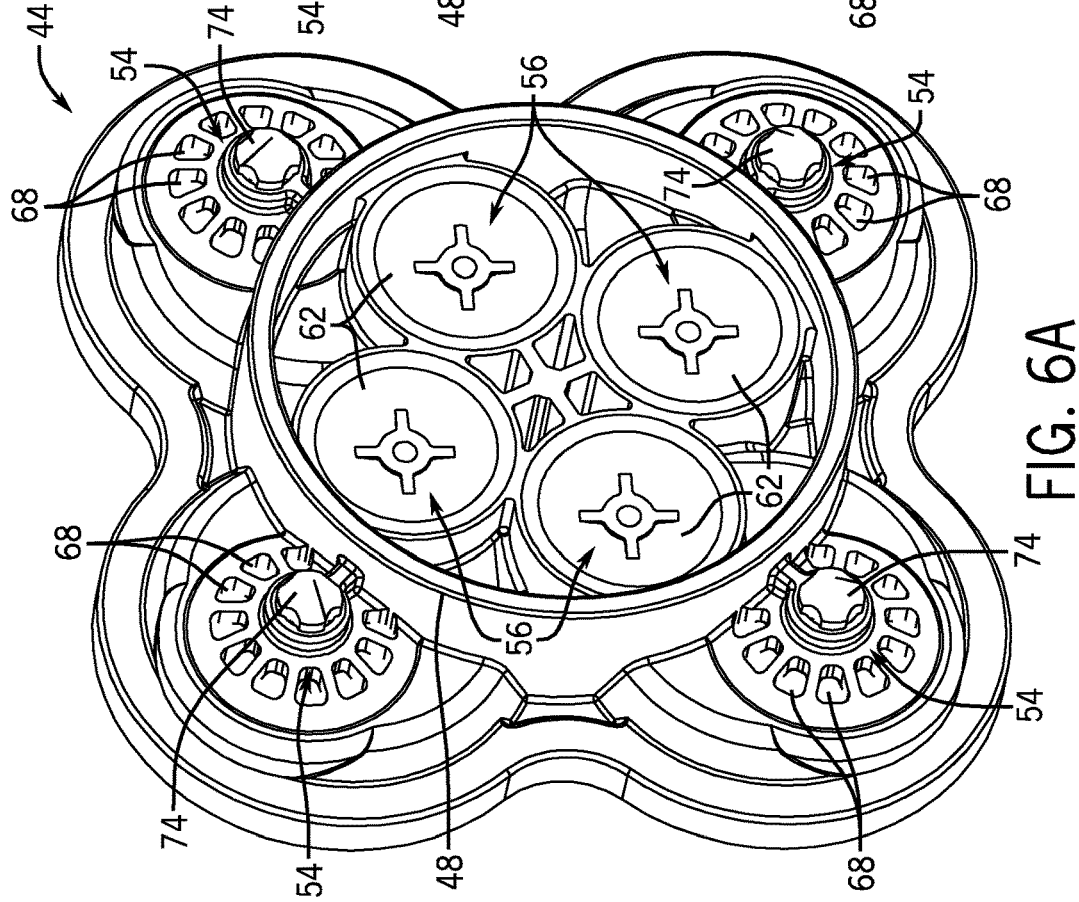

As shown in FIG. 5B, each inlet valve seat 60 can include a central inlet aperture 66 and peripheral inlet apertures 68. As shown in FIG. 6B, each outlet valve seat 64 can include a central outlet aperture 70 and peripheral outlet apertures 72. As shown in FIGS. 5A and 6A, the inlet valves 58 and the outlet valves 62 can include headed extensions 74, 76 that can be press-fitted into the respective central apertures 66, 70. In some embodiments, the inlet valves 58 and the outlet valves 62 can be disc-shaped flexible elements. In addition, each inlet valve 58 and each outlet valve 62 can include a blind hole 78 at its center on the side opposite the headed extension 74, 76, as shown in FIG. 7.

In some embodiments, as shown in FIG. 8, a valve insert 80 can be press-fitted into each blind hole 78 to secure the valve 58, 62 within the valve seat 60, 64. The use of the valve inserts 80 can prevent the valves 58, 62 from spinning or popping out of their respective central apertures 66, 70 during pump operation with high flows and/or viscosities. The valve inserts 80 can also prevent the valves 58, 62 from ballooning or rupturing at during pump operation at high pressures. In addition, the blind hole 78 can provide relief for the material of the valves 58, 62 to compress during their manufacturing process, thus preventing cracks from forming in the valves 58, 62 and failure during pump operation due to the cracks.

Figure 9:
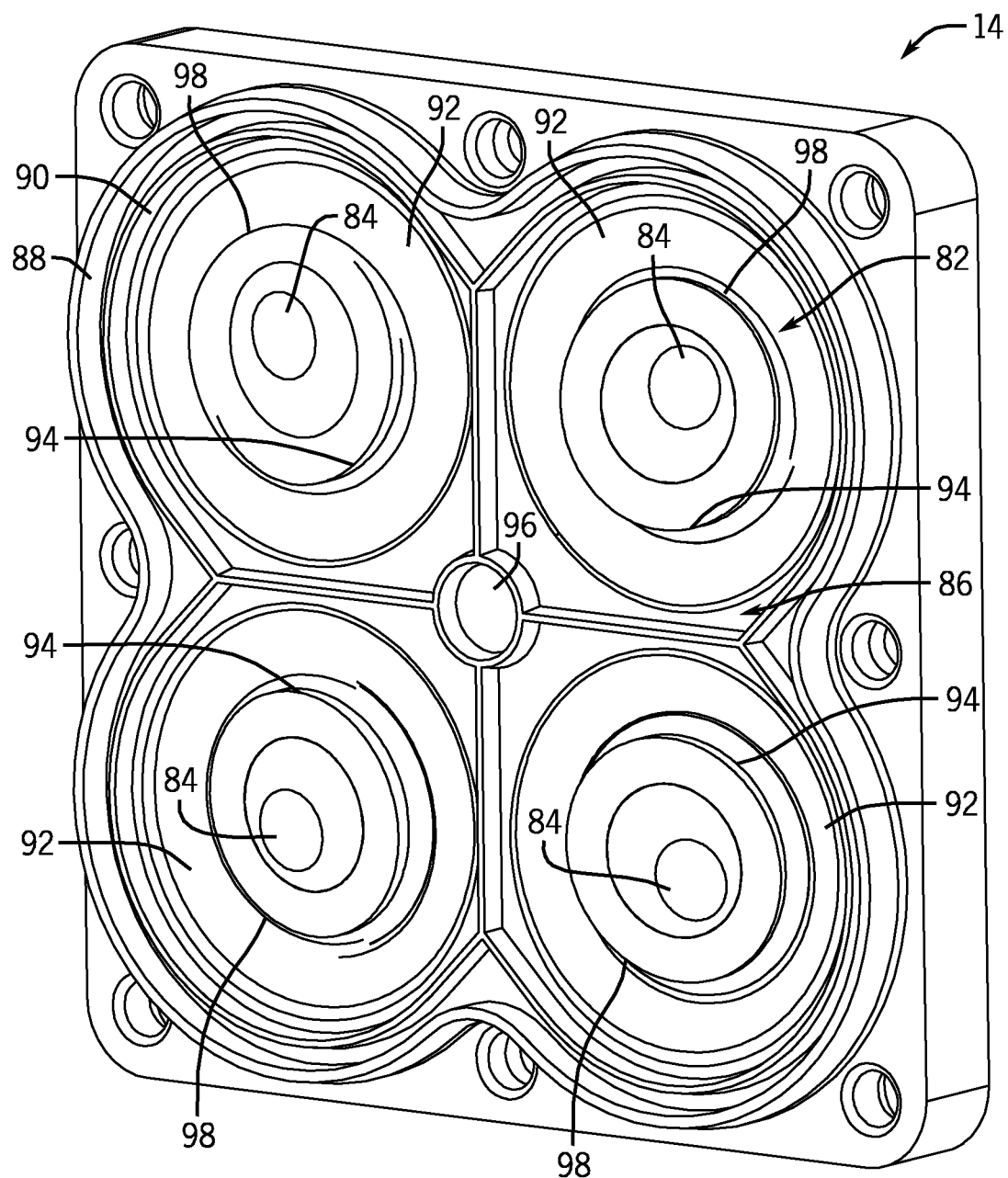
FIG. 9 is a perspective view of a diaphragm assembly for use with the diaphragm pump of FIG. 1 or 3.

As shown in FIGS. 3-4 and 9, the diaphragm assembly 14 can include a diaphragm 82 with a plurality of pistons 84. Each piston 84 can correspond to a respective pump chamber 52 of the valve housing 44. The diaphragm 82 can include a single piece of resilient material with features integral with and molded into the diaphragm 82. In other embodiments of the invention, the diaphragm 82 can be constructed of multiple elements connected together, such as by fasteners, adhesive or cohesive bonding material, snap-fit connections, etc. The diaphragm 82 can include a body portion 86 lying generally in a first plane. The pistons 84 can lie generally in a second plane parallel to the first plane of the body portion 86. The diaphragm 82 can help define the pump chambers 52 and can help isolate the pump chambers 52 from one another. For example, the diaphragm 82 can include an outer lip portion 88 and an inner lip portion 90 that fit around the perimeter of each pump chamber 52 when the valve housing 44 and the diaphragm 82 are coupled together so that each pump chamber 52 is isolated from one another when the valve housing 44 is fitted against the diaphragm 82. In some embodiments, the diaphragm 82 and the valve housing 44 can include other sealing relationships to isolate the pump chambers 52.

Each piston 84 can have a corresponding convolute 92 to couple the piston 84 to the body portion 86 of the diaphragm 82. For example, each piston 84 can be co-molded to a corresponding convolute 92. The convolutes 92 can function to allow the pistons 84 to move reciprocally and with respect to the first plane of the body portion 86 without placing damaging stress upon the diaphragm 82. Each convolute 92 can include an inner perimeter portion 94 positioned closer to a center point 96 of the diaphragm 82 than an outer perimeter portion 98. The outer perimeter portion 98 of each convolute 92 can include more material than the inner perimeter portion 94. As a result, the depth of the convolute 92 at the outer perimeter portion 98 can be larger than the depth of the convolute 92 at the inner perimeter portion 94. This arrangement can provide the piston 84 with greater range of motion at the outer perimeter 98 than at the inner perimeter 94. In this configuration, a bottom surface of each convolute 92 can be oriented at an angle sloping away from the center point 96 of the diaphragm 82 and away from the second plane in which the pistons 84 lie.

Referring back to FIG. 3, the pump 10 can include a wobble plate 100 coupled to rocker arms 102. The number of rocker arms 102 can correlate to the number of pistons 54 of the diaphragm 82. The rocker arms 102 can be coupled to the pistons 84 so that the pistons 84 are actuated by movement of the wobble plate 100. The rocker arms 102 can transmit force from the center of the wobble plate 100 to locations adjacent to the pistons 84. The center of each piston 84 can be coupled to a corresponding rocker arm 102 via a fastener 104 (e.g., screw, nut and bolt set, other threaded fastener, rivet, snap-fit connection, etc.) or another coupling manner, such as by adhesive or cohesive bonding material.

Referring back to FIG. 4, the motor 28 can include a rotatable output shaft 106 that can extend through the lower housing 16. The wobble plate 100 can engage the output shaft 106 so that, as the output shaft 106 rotates, the wobble plate 100 turns and the pistons 84 are individually engaged in turn.

During operation, fluid flows into the inlet chamber 38 from the inlet 18. Movement of the diaphragm 82 by the wobble plate 100 causes pressure differences in the pump chambers 52 and can change the orientation of the inlet valves 58 and the outlet valves 62. In a first orientation, fluid flow into the pump chamber 52 from the inlet chamber 38 is permitted by the inlet valve 58 through peripheral inlet apertures 68. In a second orientation, fluid flow out of the pump chamber 52 into the outlet chamber 40 is permitted by the outlet valve 62 through peripheral outlet apertures 72. The valves 58, 62 can function as one-way check valves, preventing fluid flow in a respective opposite direction (i.e., preventing fluid flow from the pump chambers 52 to the inlet chamber 38 or from the outlet chamber 40 into the pump chambers 52). Once in the outlet chamber 40, fluid can exit through the outlet 20. Pressure in the outlet chamber 40 can be monitored by the pressure switch assembly 22 and, in some embodiments, the motor 28 can be operated based on the monitored pressure. In addition, if pressure in the inlet chamber 38 exceeds a threshold, the relief valve assembly 24 can allow fluid to flow directly from the inlet chamber 38 to the outlet chamber 40 until the pressure in the inlet chamber 38 falls below the threshold.

Figure 10:
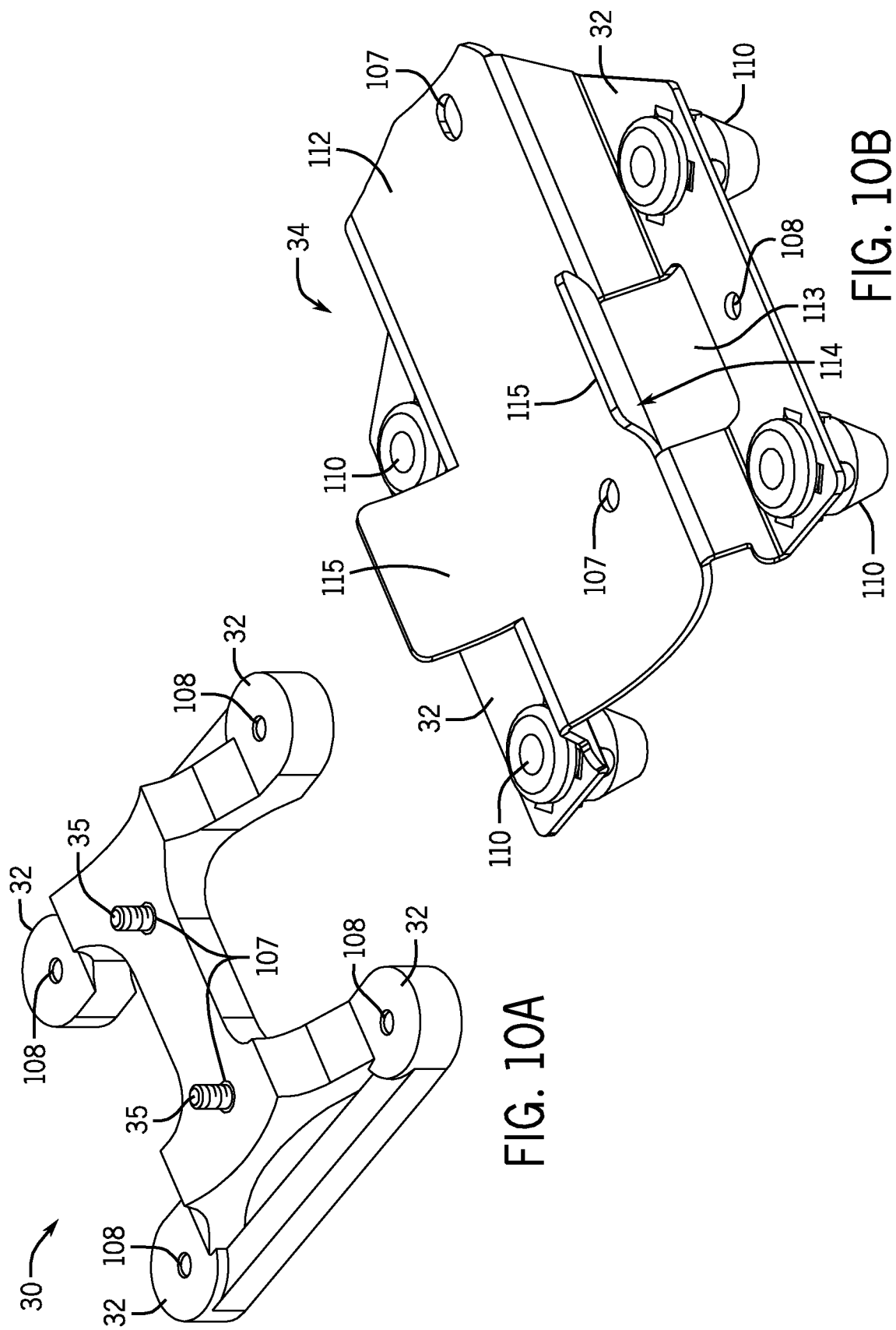
FIG. 10A is a perspective view of a baseplate for use with the diaphragm pump of FIG. 1.
FIG. 10B is a perspective view of a baseplate for use with the diaphragm pump of FIG. 3.

FIG. 10A illustrates the baseplate 30 of FIGS. 1-2. FIG. 10B illustrates the baseplate 34 of FIGS. 3-4. The baseplates 30/34 can be coupled to the motor 28 by fasteners 35 through mounting holes 107. Also, the baseplates 30/34 can include leg holes 108 extending through the legs 32 to accommodate mounting of the pump 10 and the motor 28 to a surface via the legs 32, the leg holes 108, and fasteners (not shown). As shown in FIGS. 3-4 and 10B, the baseplate 34 can include removable cushions 110 positioned on or through the legs 32. The cushions 110 can be constructed of a resilient material (e.g., rubber, urethane, etc.) so that vibration from the pump 10 to the surrounding environment can be reduced.

As shown in FIG. 10B, the baseplate 34 can have an elongated base 112 that is in contact with the motor 28, thus permitting a large surface area for heat dissipation from the motor 28 during operation. For example, the base 112 can be curved in order to maintain contact around a portion of the circumference of the motor 28. The base 112 can also include a cutout 114. The cutout 114 can provide an opening 113 between the base 112 and the legs 32 and can include rounded flanges 115 that correspond with the shape of the motor 28. More specifically, the rounded flanges 115 can extend from the opening 113 around a portion of the circumference of the motor 28. The cutout 114 can allow the option of coupling the baseplate 34 to the motor 28 with drive clamps or tie wraps (e.g., through the opening 113 and around the motor 28, the flanges 115, and the base 112). In some embodiments of the invention, this option can be used in conjunction with the mounting holes 107 and the fasteners 35. In other embodiments, this option can be used instead of the mounting holes 107 and the fasteners 35. Also, in some embodiments, the cutout 114 may only include the opening 113 without the flanges 115.

Figure 11:
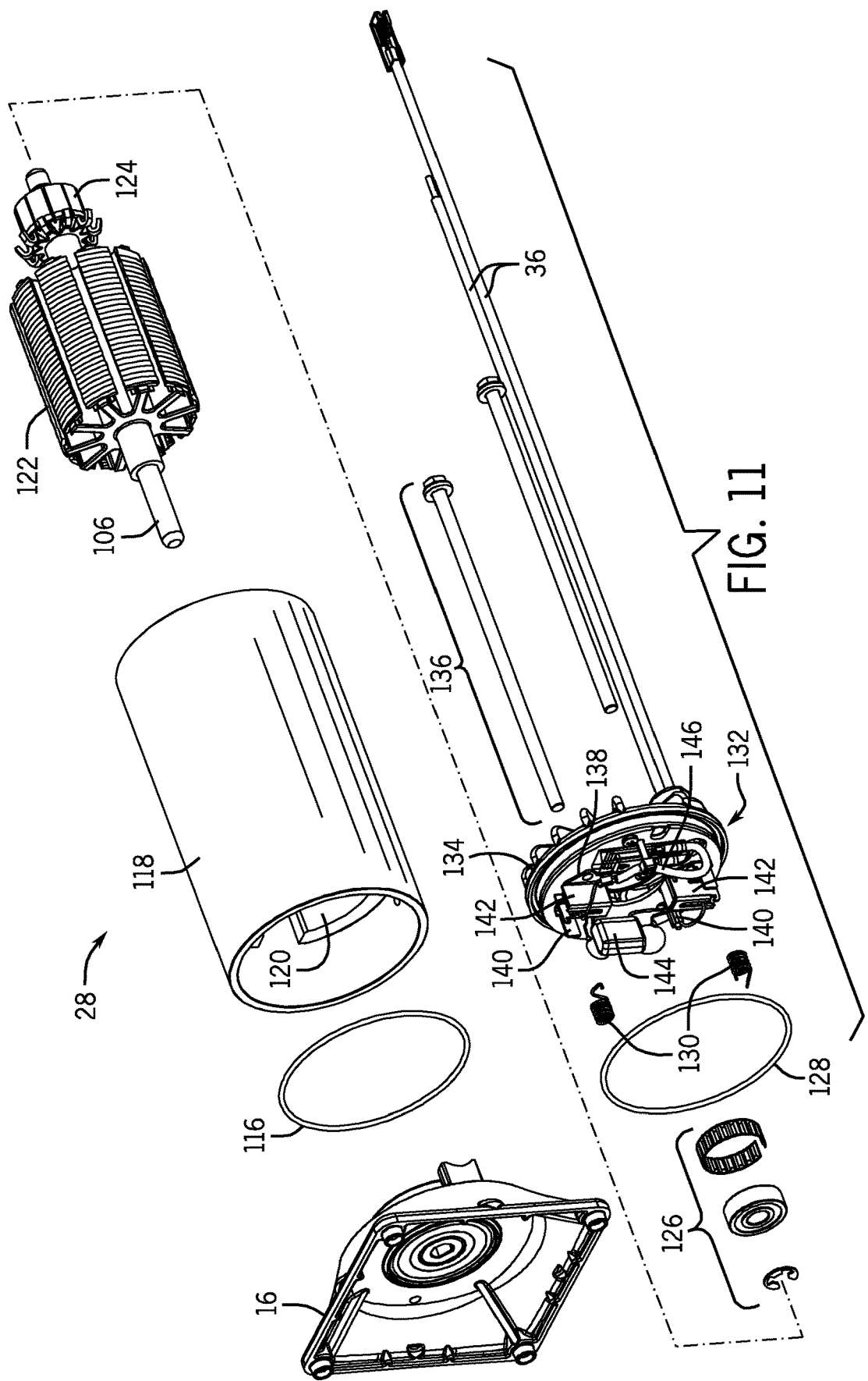
FIG. 11 is an exploded perspective view of a motor for use with the diaphragm pump of FIG. 1 or 3.

In some embodiments, as shown in FIG. 11, the motor 28 can include a first o-ring 116, a motor housing 118, internal magnets 120, an armature 122, a commutator 124, bearings and washers 126, a second o-ring 128, brush springs 130, a brush ring assembly 132, a rear endbell or shroud 134, and fasteners 136. The fasteners 136 can extend from the rear endbell 134, through the motor housing 118, to the lower housing 16 to couple the motor 28 to the lower housing 16. In addition, the brush ring assembly 132 can include a brush ring 138, one or more brushes 140, brush holders 142, capacitors 144, and a thermal protector 146. As shown in FIG. 11, the motor 28 is a two-brush, direct current (DC) motor. In some embodiments, the motor 28 can include more than two brushes 140. On the brush ring assembly 132, the electrical connections 36 (e.g., positive and negative electrical connections) can each be connected to one of the two brushes 140 via brush leads 148 (e.g., as shown in FIG. 12A, through the thermal protector 146 or the capacitors 144). The brushes 140 can come in contact with the commutator 124, causing current flow through the armature 122 and magnetic field generation. As a result of the magnetic field generated by the armature 122 and the adjacent internal magnets 120, the armature 122 rotates within the motor housing 118, also causing rotation of the output shaft 106. In addition, in some embodiments, the motor 28 can be an alternating current (AC) rectified motor (e.g., the motor 28 can rectify alternating current input to provide direct current to the brushes 140).

FIG. 12A illustrates a partial view of the brush ring assembly 132, including the two brushes 140, the brush holders 142, and the brush springs 130. As shown in FIGS. 12A and 12B, the brush springs 130 can be torsion springs, each including an urging end portion 150 and an opposite end leg portion 152. As shown in FIGS. 12A and 12C, each brush holder 142 can include a mounting portion 154 for mounting the brush holder 142 to the brush ring 138 (e.g., via rivets 156), a brush opening or through hole 157 to accommodate the brush 140, a brush lead track or slit 158 to accommodate the brush lead 148, a spring wire track or slit 160 to accommodate the urging end portion 150 of the brush spring 130, a spring holder 162 to support the brush spring 130, and a spring anchor 164 to secure the end leg 152 of the brush spring 130.

As shown in FIG. 12A, the urging end portion 150 of the brush spring 130 can extend through the spring wire track 160 and press against an outer surface 166 of the brush 140. As a result, the brush spring 130 presses the brush 140 against the commutator 124, ensuring a solid connection between the brush 140 and the rotating commutator 124. The brush spring 130 can continue to urge the brush 140 inwardly against the commutator 124 despite continuous wear on the brush 140 (e.g., due to the brush 140 being in constant contact with the rotating commutator 124). As shown in FIG. 12B, the urging end portion 150 can include an axially extending portion 168. The entire length of the axially extending portion 168 (i.e., between the edge 170 of the brush spring 130 and a bend 172 along the urging end portion 150, as shown in FIG. 12B) can press against the brush 140 to urge the brush 140 inwardly, in comparison to a single end point or edge point of conventional brush springs. The axially extending portion 168 can provide a line contact against the brush 140 (e.g., in comparison to conventional point contacts), ensuring that the brush spring 130 continues to urge the brush 140 inwardly as either component wears. The axially extending portion 168 can provide a longer life for the brush spring 130, since wear will occur along the entire length of the axially extending portion 168 less quickly than on an end point contact of conventional brush springs.

Conventionally, spring anchors that are integral with a brush holder will position the spring end leg over the top of the brush opening. As a result, the initial length of the brush is limited by the positioning of the spring end leg. In some embodiments, as shown in FIG. 12C, the spring anchor 164 can be a hook offset from the brush opening 157 (e.g., in front of the brush opening 157). More specifically, in one embodiment, the spring anchor 164 can be positioned opposite from the mounting portion 154 of the brush holder 142, or further away from the brush ring 138 than the spring wire track 160. The unimpeded brush opening 157 can thus permit longer brushes 140, and as a result, longer life of the motor 28 before brush replacement is necessary.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A brush ring assembly, comprising:
 a brush ring;
 a brush holder coupled to the brush ring, the brush holder including
  a side wall,
  a mounting portion extending from the side wall, and
  a spring holder extending from the mounting portion, wherein
   the side wall, the mounting portion, and the spring holder are integrally formed and substantially equal in thickness; and
 a helical torsion spring coupled to the brush holder and including a coiled spring body having a first end and a second end, the first end being opposite the second end, the first end defining a first transverse plane, the second end defining a second transverse plane,
  a first end portion having a first section and a second section, the first section extending from the first end, the second section extending from the first section in a direction from the first transverse plane toward the second transverse plane, and
  a second end portion extending from the second end.

2. The brush ring assembly of claim 1, wherein the first end portion presses a motor brush against a commutator.

3. The brush ring assembly of claim 1, wherein the second end portion is secured to the brush holder by a spring anchor hook of the brush holder.

4. The brush ring assembly of claim 1, wherein the first end portion extends through a spring wire slit of the brush holder.

5. The brush ring assembly of claim 1, wherein the brush holder includes a spring anchor hook, a spring wire slit, and a brush spring holder.

6. The brush ring assembly of claim 5, wherein the first end portion extends through the spring wire slit, the second end portion is secured by the spring anchor hook, and the brush spring holder extends through the coiled spring body.

7. The brush ring assembly of claim 1, wherein the first end portion is bent with respect to the first end along the first transverse plane.

8. A brush ring assembly, comprising:
 a brush ring;
 a brush holder coupled to the brush ring; and
 a brush spring including a first end portion, a second end portion, and a coiled spring body with a central opening, the second end portion being coupled to the brush holder, the first end portion including
  a first section extending away from the coiled spring body,
  a second section extending away from the first section, and
  a third section extending away from the second section and axially toward the second end portion, the third section being substantially parallel with a longitudinal axis extending through the central opening of the coiled spring body.

9. The brush ring assembly of claim 8, wherein the brush holder includes a longitudinally extending brush opening.

10. The brush ring assembly of claim 9, wherein the brush holder includes a brush lead slit extending longitudinally from a first end of the brush opening toward a second end of the brush opening.

11. The brush ring assembly of claim 9, wherein the brush holder includes a spring wire slit extending longitudinally from a first end of the brush opening toward a second end of the brush opening.

12. The brush ring assembly of claim 11, wherein the third section is substantially perpendicular to the spring wire slit.

13. The brush ring assembly of claim 11, wherein the brush holder further includes a spring anchor formed as a hook that is offset from the brush opening such that the spring anchor is positioned farther away from the brush ring than the spring wire slit.

14. The brush ring assembly of claim 9 wherein the brush holder includes:
- a brush lead slit extending longitudinally from a first end of the brush opening toward a second end of the brush opening, and
- a spring wire slit extending longitudinally from the first end of the brush opening toward the second end of the brush opening parallel to the brush lead slit,
- wherein the third section is substantially perpendicular to the brush lead slit and the spring wire slit.

15. The brush ring assembly of claim 14, wherein the first end portion extends through the spring wire slit, a brush lead extends through the brush lead slit, and the second end portion is secured to the brush holder by a spring anchor of the brush holder.

16. A brush ring assembly for a pump motor, the brush ring assembly comprising:
- a brush ring;
- a brush holder coupled to the brush ring, the brush holder including a brush opening;
- a brush spring including a coiled spring body defining a longitudinal axis, a first end portion, and a second end portion, the second end portion being coupled to the brush holder, the first end portion including:
  - a first section extending transversely away from the coiled spring body and angularly away from the second end portion,
  - a second section extending away from the first section, transversely away from the coiled spring body, and angularly toward the second end portion, and
  - a third section extending away from the second section and axially toward the second end portion, the third section being substantially parallel with the longitudinal axis; and
- a brush extending through the brush opening, the third section contacting an outer surface of the brush.

17. The brush ring assembly of claim 16, wherein the second end portion is secured to the brush holder by a spring anchor hook of the brush holder, the spring anchor hook being offset from the brush opening such that the brush opening is unimpeded by the second end portion.

18. The brush ring assembly of claim 17, wherein the brush holder includes a mounting portion positioned on an opposite side of the brush holder than the spring anchor hook.

19. The brush ring assembly of claim 16, wherein the third section is substantially perpendicular to a spring wire slit of the brush holder through which the second end portion extends.

20. The brush ring assembly of claim 16, wherein the brush holder is coupled to the brush ring by a mounting portion.

\* \* \* \* \*